Jan. 17, 1961  D. R. HECKMAN  2,968,413
BOAT TRAILER
Filed July 16, 1958  2 Sheets-Sheet 1

INVENTOR.
DONALD R. HECKMAN
BY
Woodhams, Blanchard & Flynn
ATTORNEYS

Jan. 17, 1961    D. R. HECKMAN    2,968,413
BOAT TRAILER
Filed July 16, 1958    2 Sheets-Sheet 2

INVENTOR.
DONALD R. HECKMAN
BY
Woodhams, Blanchard & Flynn
ATTORNEYS

United States Patent Office 2,968,413
Patented Jan. 17, 1961

2,968,413
BOAT TRAILER

Donald R. Heckman, St. Joseph, Mich., assignor to F.A. Long Company, Benton Harbor, Mich., a corporation of Michigan Filed July 16, 1958, Ser. No. 748,985

1 Claim. (Cl. 214—505)

This invention relates in general to a boat trailer and, more particularly, to a type thereof having a vertically adjustable bed with a low angle of incline for water-level loading and launching.

The transportation of boats, particularly of the type upon which outboard motors are mounted, from a place of storage to the water's edge and thence into or out of the water has always been a source of considerable difficulty and inconvenience. A great many trailer constructions have been designed and built for this purpose. However, insofar as I am aware, none of these trailer structures have been entirely satisfactory for one or more of several reasons. That is, existing boat trailers often: (1) are too expensive by comparison with the cost or the boat with which they are used or the purpose for which they are intended, (2) are too difficult to operate and handle by one person, (3) require continual maintenance and upkeep, (4) impose an excessive load upon the vehicle to which they are attached, (5) are injurious to the boat which they carry, particularly when moved along the roads often found near the edge of a body of water, or (6) are not arranged for conveniently loading and launching the boat directly at the water's edge. Persons acquainted with boat trailers will recognize that these are only a few of the existing problems.

Accordingly, in a continuing effort to improve upon the existing boat trailers, a primary object of this invention has been the provision of an inexpensive, sturdy and relatively lightweight boat trailer construction wherein the boat supporting bed is vertically adjustable and sufficiently close to the ground that, when lowered into the boat loading or launching position, it has a very low angle of incline whereby such loading and launching can be easily accomplished by a single individual with relatively little effort.

A further object of this invention has been the provision of a boat trailer, as aforesaid, wherein the raising and lowering of the boat supporting bed can be accomplished with very little effort by means adjacent the forward end of the trailer.

A further object of this invention has been the provision of a boat trailer, as aforesaid, which is foolproof in operation, which requires little or no maintenance, which can be used by any person capable of operating an automobile jack and a winch, and which is not only very rugged in construction, but provides a stable, reliable support for the boat even when used under very severe conditions.

Other objects and purposes of the invention will become apparent to persons familiar with this type of equipment upon reading the following specification and examining the accompanying drawings, in which.

General descripiton

The objects of the invention, including those set forth above, have been met by providing a boat trailer with an elongated, relatively flat bed structure, having a hitch mechanism at the front end and a transverse shaft rotatably supported thereon near the other end thereof. A pair of wheels are rotatably supported by means secured to the opposite ends of said shaft for rotation about a common axis parallel with and spaced substantially from said shaft. Said wheels and said supporting means are located outwardly of the bed structure so that said common axis can be pivoted about the axis of said shaft. A pressure fluid actuated power device is mounted upon the front end of said bed structure and connected by linkage to a crank on said shaft whereby rotative movement of said shaft can be effected upon operation of said pressure fluid actuated device. A winch and boat engaging means are mounted upon the upper surface of said bed structure.

Detailed construction

Figure 1:
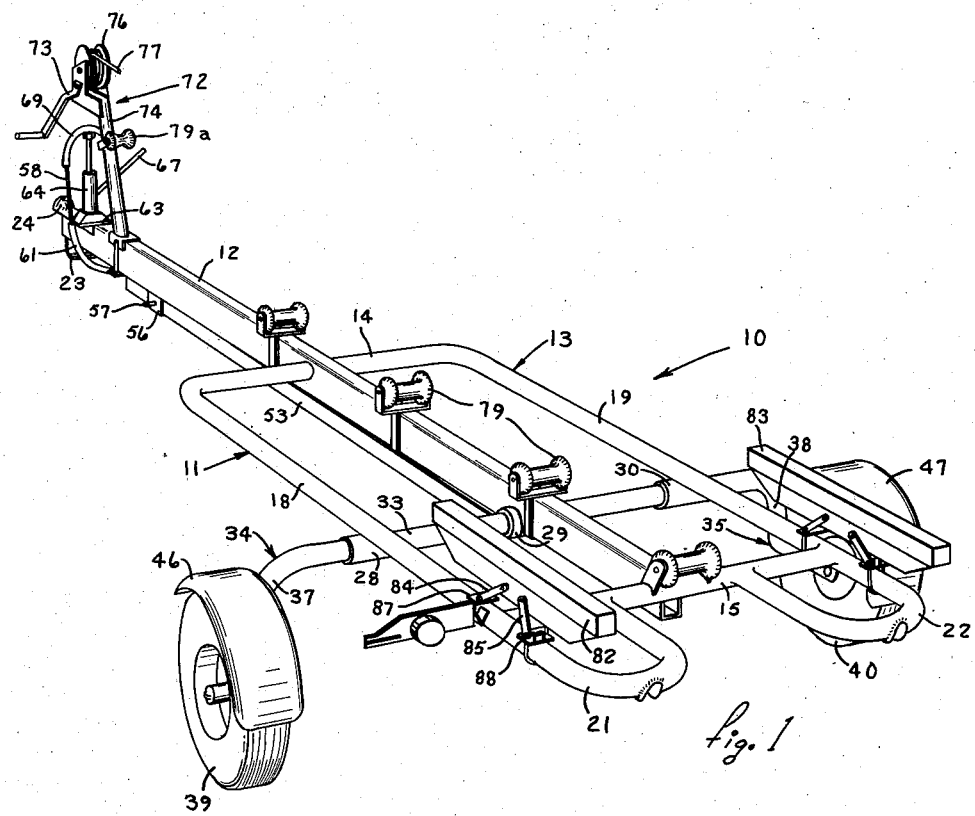
Figure 1 is a perspective view of a boat trailer embodying the invention.
Figure 3:
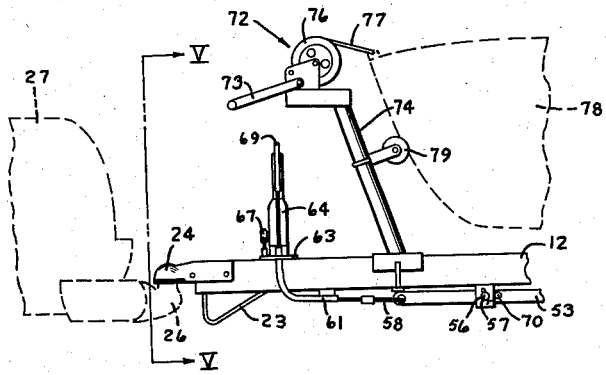
Figure 3 is a side elevational view of the front end of said boat trailer including broken-line fragments of a vehicle and boat with which said boat trailer is associated.

For the purpose of convenience in description the terms "front," "rear" and derivatives thereof will have reference to the usual direction of movement of a boat trailer characterizing the invention when hitched to and being pulled by a vehicle. The terms "upper," "lower" and derivatives thereof will have reference to said boat trailer in its normal position of use as appearing in Figures 1, 3 and 4. The terms "inner," "outer" and derivatives thereof will have reference to the geometric center of the boat trailer and parts associated therewith.

The boat trailer 10 (Figure 1), which has been selected to illustrate the invention, is comprised of a substantially flat bed structure 11 including an elongated, tubular and metal beam 12 having a substantially rectangular cross-section in this embodiment. Said bed structure also includes a support frame 13 secured to said beam and comprised of spaced front and rear elements 14 and 15, respectively, which are secured between their ends to said beam and extend transversely thereof. The front element 14 is disposed approximately midway between the front and rear ends of the beam 12, the rear element 15 is disposed at the rear end of said beam 12, and both of said elements are preferably fabricated from tubular, metallic material of circular cross section. The frame 13 includes a pair of side elements 18 and 19 which are secured to and extend substantially parallel with said beam 12 between the corresponding ends of the front and rear elements 14 and 15. The frame also has at the rearward end thereof a pair of U-shaped bumpers 21 and 22 which may be formed from rearward extensions of the side elements which are curved back upon themselves and secured at their free ends to the rear element 15. The front and rear frame elements 14 and 15 may extend through the beam 12 and are preferably secured thereto by welding.

Figure 2:
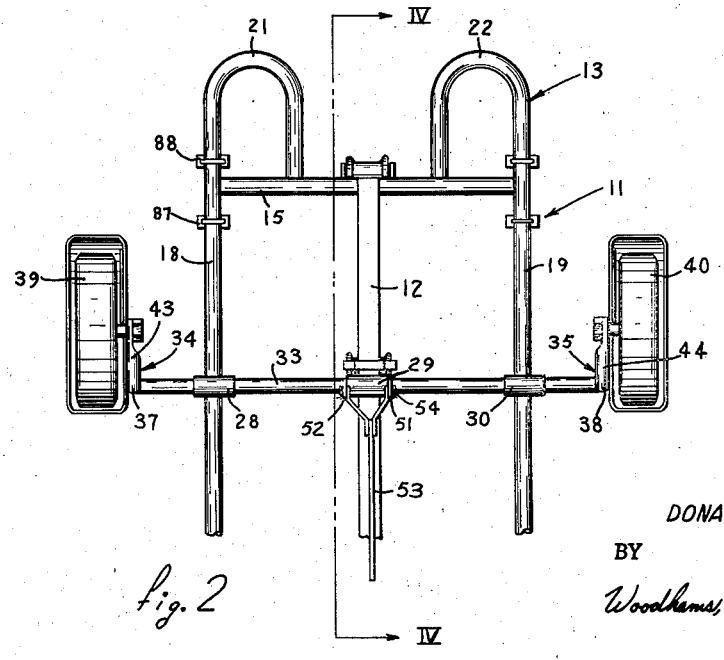
Figure 2 is a bottom view of the rearward portion of said boat trailer.
Figure 5:
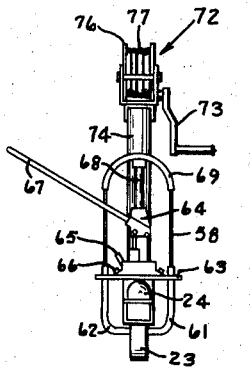
Figure 5 is a sectional view taken along the line V—V of Figure 3.

A skid 23 (Figures 3 and 5) is secured to the lower surface of the beam 12 near the frontward end thereof. The female fixture 24 of a trailer hitch is secured to the front end of the beam 12 for engagement with the male fixture of such hitch, shown in broken lines at 26 on the rear end of a vehicle 27. Three coaxial and spaced bearing sleeves 28, 29 and 30 (Figure 2) are secured by means, such as welding, to the lower surfaces of the side element 18, the beam 12, and the side element 19, respectively, so that their common axis is preferably substantially perpendicular to the lengthwise extent of said beam.

A shaft 33 (Figure 2) is rotatably received into and through the sleeves 28, 29 and 30 so that it extends substantially beyond the opposite ends of the sleeves 28 and 30. A pair of L-shaped wheel supports 34 and 35 have inner legs 37 and 38 which are preferably substantially perpendicular to said shaft 33 and integral at their free ends with the opposite ends, respectively, of the shaft 33. A pair of wheels 39 and 40 are rotatably supported upon the outer legs 43 and 44 near the free ends thereof for rotation about a common axis parallel with and spaced from said shaft 33. In this particular embodiment, the outer legs 43 and 44 are substantially parallel and the wheel supports 34 and 35 are integral with and part of the tubular member comprising the shaft 33. Fenders 46 and 47 are mounted upon the wheel supports 34 and 35 by means such as the fender braces 48 shown in Figure 4.

A pair of spaced, coextensive crank arms 51 and 52 are secured to the shaft 33 (Figure 2) on opposite sides of the sleeve 29 and extend radially in substantially the same direction. An elongated link bar 53 is pivotally supported at one end upon and between the arms 51 and 52 near the free ends thereof by means of the pivot rod 54. The forward end portion of the link bar 53 is slidably disposed and supported within a lock bracket 56 secured on the lower side of the beam 12. Both the lock bracket 56 and the link bar 53 have openings through which a lock pin 57 is slidably receivable when the stop pin 70 on the bar 53 is against the bracket 56, at which time the inner legs 37 and 38 of the wheel supports 34 and 35 are in substantially upright positions and the wheels 39 and 40 are, therefore, in their extended or lowered positions.

The front end of the link bar 53 is connected to the ends of a flexible element, such as the cable 58, which extends through a pair of substantially L-shaped guide sleeves 61 and 62 secured to and disposed on opposite sides of the beam 12. The guide sleeves 61 and 62 are preferably arranged so that one end portion of each is substantially horizontal and axially aligned with the lengthwise extent of the link bar 53 near its frontward end. The other end portions of said sleeves extend substantially vertically and upwardly through appropriate openings in the mounting pad 63 secured to and supported upon the front end of the beam 12. A pressure fluid actuated device, such as the hydraulic automobile jack 64, has its base supported upon and secured to the mounting pad 63 by convenient means, such as the bolts 66. The jack 64 has an actuating handle 67 and an upwardly extending jack ram 68, the upper end of which is secured to the concave side of a semicircular sleeve 69 preferably midway between the ends thereof. The cable 58 slidably extends through the sleeve 69.

A winch 72 having a handle 73 is supported upon the upper end of a winch post 74 which is mounted upon and extends upwardly from the front end of the beam 12 rearwardly of the mounting pad 63. The winch drum 76 is rotatable about an axis parallel with the axis of the shaft 33 and is capable of supporting a rope or cable 77 connected to a boat, as shown in broken lines at 78 in Figure 3.

A plurality of axially parallel and radially aligned rollers 79 are mounted upon the beam 12 for engaging the keel of said boat 78 during the loading, supporting and launching thereof. The roller 79a on the winch post 74 engages the bow of the boat 78 and may be slightly narrower than the keel engaging rollers 79. A pair of elongated substantially parallel side supports 82 and 83 are adjustably supported upon the opposite sides of the frame 13 near its rearward end and are provided with padding on their upper surfaces for engaging the sides or bottom of said boat and cradling same therebetween. More specifically, the side support 82, for example, is pivotally secured on opposite sides to the ends of two pairs of links 84 and 85, the other ends of said links being pivotally secured to the brackets 87 and 88 which are preferably secured to the side element 18 and the extension thereof providing the bumper 21, respectively. The pivotal connections of the links 84 and 85 with the side support 82 are preferably closer than the pivotal connections of said links with the brackets 87 and 88. Thus, the side support 82 is capable of moving with a rocking motion through a substantially arcuate path for the purpose of automatically adjusting to the longitudinal curvature in the boat 78 supported thereon. The side support 83, which is mounted upon the side element 19 and its rearward extension, is preferably identical to the side support 82. By moving the brackets 87 and 88 toward or away from each other, the cradle comprising the supports 82 and 83 can be raised or lowered, respectively.

Operation

Figure 4:
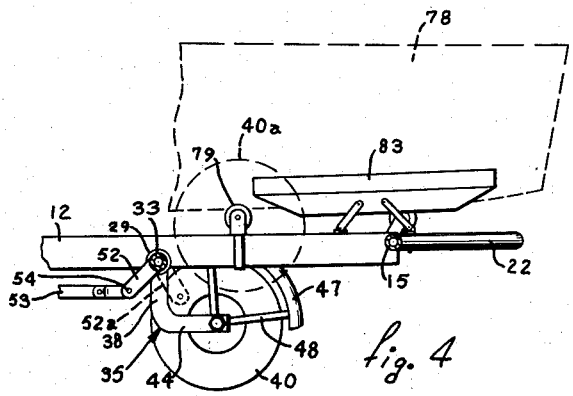
Figure 4 is a sectional view substantially as taken along the line IV—IV of Figure 2 including a broken-line fragment of a boat.

Operation of the trailer 10 (Figure 1) will normally occur when the hitch fixture 24 is connected to a trailer hitch 26 (Figure 3) on the rear of a vehicle in a substantially conventional manner. The lock pin 57 will be in position so that the wheels 39 and 40 and their supports 34 and 35 will be in their lowered or extended positions. Because the common axis of the wheels 39 and 40 is eccentric to the shaft 33, the force of gravity will tend to retract said wheels. However, such retraction must be effected only if accompanied by a rearward movement of both the arms 51 and 52 and the link bar 53. Thus, in this instance, the operation is commenced by first pumping the jack handle 67 so that the piston rod 68 is extended to the point where it will hold the cable 58 reasonably taut. The lock pin 57 is then removed from the lock bracket 56, the relief valve 65 (Figure 5) is opened, and the hydraulic jack 64 is slowly bled so that the cable 58 permits rearward movement of the link bar 53. This, in turn, permits a counterclockwise rotation of the arms 52, as shown in Figure 4, and a corresponding counterclockwise rotation of the shaft 33 whereby the wheel supports 34 and 35 and the wheels 39 and 40 are retracted and moved upwardly with respect to the bed structure 11. Such movement will be terminated when the bumpers 21 and 22 are adjacent to or engage the ground or other surface supporting the wheels 39 and 40. That is, the length of the cable 58 and the stroke of the piston rod 68 in the hydraulic jack 64 are such that the piston rod 68 is substantially completely retracted when the wheels 39 and 40 are in their retracted position, indicated in broken lines at 40a in Figure 4, with respect to the bed structure 11. Under such circumstances each of the arms 51 and 52 will be in the broken line position indicated at 52a in Figure 4. When the bed structure 11 is in its inclined position for loading and launching its rear end may be supported upon the bumpers 21 and 22.

The cable 77 on the winch drum 76 is now unwound and connected to the boat 78 having the front end of its keel resting adjacent to the rearwardmost roller 79 on said bed structure 11. The winch handle 73 is then turned, thereby drawing up the cable 77, until the forward end of the boat engages the bow roller 79a supported upon the winch post 74. As the boat moves along the rollers 79, it engages and then slides along the side supports 82 and 83 which automatically adjust to changes in the lengthwise contour of the portion of the boat 78 engaged thereby. The side supports 82 and 83 preferably have compressible material, such as an externally covered sponge-rubber pad, on their boat engaging surfaces so that they snugly engage and guide but do not necessarily support the weight of the boat, such support being provided by the rollers 79. However, the side supports 82 and 83 are sufficiently strong that they will prevent tipping of the boat even when the trailer turns a relatively sharp corner.

With the boat 78 in position on the bed structure 11, and the winch locked against rotation in any convenient conventional manner, the relief valve 65 is closed and the jack handle 67 is operated whereby the cable 58 is moved forwardly and upwardly and draws the link bar 53 forwardly therewith. This causes the arms 51 and 52 (Figure 2) to be moved forwardly of the shaft 33 whereby both wheels 39 and 40 are moved from their retracted position, as indicated at 40a in Figure 4, to their extended position shown in solid lines in Figure 4. Operation of the jack 64 is terminated when the stop pin 70 on the link bar 53 strikes the lock bracket 56 and the openings in the link bar 53 and the lock bracket 56 are aligned. The lock pin 57 is then inserted through such openings, thereby positively preventing any lengthwise movement of the link bar 53 with respect to the bed 12. The pressure within the hydraulic jack 64 can either be maintained within the jack 64 or bled out by valve 65 as convenient, thereby releasing any tension on the cable 58. The entire trailer including the boat 78 is now ready for movement.

When the trailer and boat thereon reach the location for launching the boat, such is accomplished easily and quickly by first operating the jack 64 so that sufficient tension is placed on the cable 58 that it is possible to remove the lock pin 57 from its position holding the link bar 53 with respect to the lock bracket 56. After removal of usch pin 57, the pressure fluid in the hydraulic jack 64 is again bled out by opening relief valve 65, thereby lowering the bed structure 11 with respect to the wheels 39 and 40 in the same manner as set forth above with respect to the loading of the trailer. The winch 72 is released, so that the cable 77 can unwind from the drum 76, and the boat 78 rolls downwardly and rearwardly along the rollers 79 until it slips off the rearward end of the bed strncture 11. The cable 77 is released from the boat and returned to the winch drum 76 or left extended for conventience in subsequent loading. Such loading, when desired, can be accomplished easily and quickly in substantially the same manner set forth above with respect to the initial loading.

Figure 6:
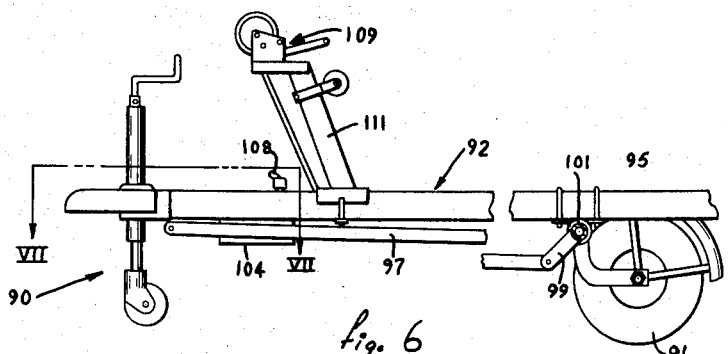
Figure 6 is a broken and fragmentary side elevational view of a modified boat trailer embodying the invention.
Figure 7:
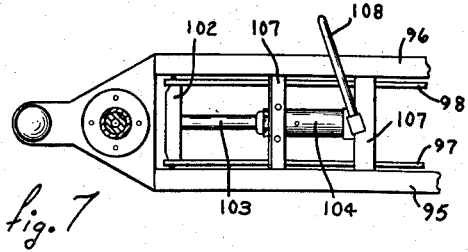
Figure 7 is a sectional view taken along the line VII—VII of Figure 6.

Figures 6 and 7 illustrate a modified trailer 90 having alternate structure for raising and lowering the wheels 91 with respect to the bed structure 92 and having a pair of spaced elongated beams 95 and 96 which extend lengthwise thereof. A pair of parallel, spaced and elongated link bars 97 and 98 are secured at their rearward ends to means, such as the arms 99 on the shaft 101. The forward ends of the link bars 97 and 98 are connected to the opposite ends of the crosshead 102 on the jack ram 103 of the hydraulic jack 104 which is disposed between, and is axially parallel with, the lengthwise extent of the link bars 97 and 98. The jack 104 is mounted upon and below the beams 95 and 96 by means of the cross braces 107 and is operated by a handle 108 disposed above said beams 95 and 96.

A winch 109 is supported upon a winch post 111 which is in turn mounted upon the beams 95 and 96 near the forward ends thereof. In operation, the alternate trailer 93 is substantially the same as the trailer 10. The principal difference between the two resides in the fact that the trailer 93 has a horizontally disposed jack connected to a pair of link bars whereas the trailer 10 has a vertically disposed jack 64 and only one link bar 53. It will be apparent that the trailer 93 is designed for and is capable of supporting greater loads than the trailer 10.

Although particular preferred embodiments of the invention have been disclosed in detail above for illustrative purposes, it will be understood that variations or modifications of such disclosures, which lie within the scope of the appended claim, are fully contemplated.

What is claimed is:

A boat trailer comprising: a rigid, boat support frame including an enlongated central beam structure having an elongated central member, and a pair of elongated side elements spaced from and extending lengthwise of said beam structure and disposed substantially in the same plane therewith, said side elements being connected with said beam structure near the rearward end thereof and between the ends thereof; hitch means secured to the forward end of said beam structure; a plurality of spaced, coaxial sleeves secured to the beam structure and said side elements near the rearward end of said beam structure, the common axis of said sleeves extending perpendicularly to the lengthwise extent of said beam structure; a shaft extending through said sleeves and rotatably mounted therein, said shaft having similar wheel support members at the opposite ends thereof and extending downwardly and rearwardly therefrom; a wheel rotatably mounted on each of said support members adjacent the rearward end thereof, the wheels being rotatable about a common axis parallel with and normally spaced downwardly and rearwardly of said shaft; an arm secured to said shaft approximately midway between the ends thereof and extending downwardly therefrom, said arm being movable between two positions circumferentially spaced from each other around said shaft; an upstanding winch post rigidly secured upon the beam structure near the front end thereof and a winch on the upper end of said post; a hydraulic jack mounted on said beam structure and adjacent to said winch post, said jack including a piston; linkage means connected to said piston and movable with respect to said beam structure in response to movement of said piston; control means for said jack located adjacent to said winch post and manually engageable at a point near said winch; an elongated, rigid link member extending substantially parallel with and directly beneath said elongated beam structure and closely adjacent thereto, said link member being connected at one end thereof with said linkage means for longitudinal movement of said link member with respect to said beam structure, said link member being pivotally connected at the other end thereof to said arm whereby said arm is moved between its two positions, said shaft is pivoted and said wheels are positively moved upwardly and downwardly with respect to the frame.

References Cited in the file of this patent

UNITED STATES PATENTS

| 2,230,014 | Raven | Jan. 28, 1941 |
| 2,458,949 | Lull | Jan. 11, 1949 |
| 2,496,599 | Rivers | Feb. 7, 1950 |
| 2,643,894 | Schroeder | June 30, 1953 |
| 2,776,769 | McDonald | Jan. 8, 1957 |